Feb. 17, 1942.     G. A. KELLEY     2,273,270
CONCENTRATION APPARATUS
Original Filed July 20, 1932
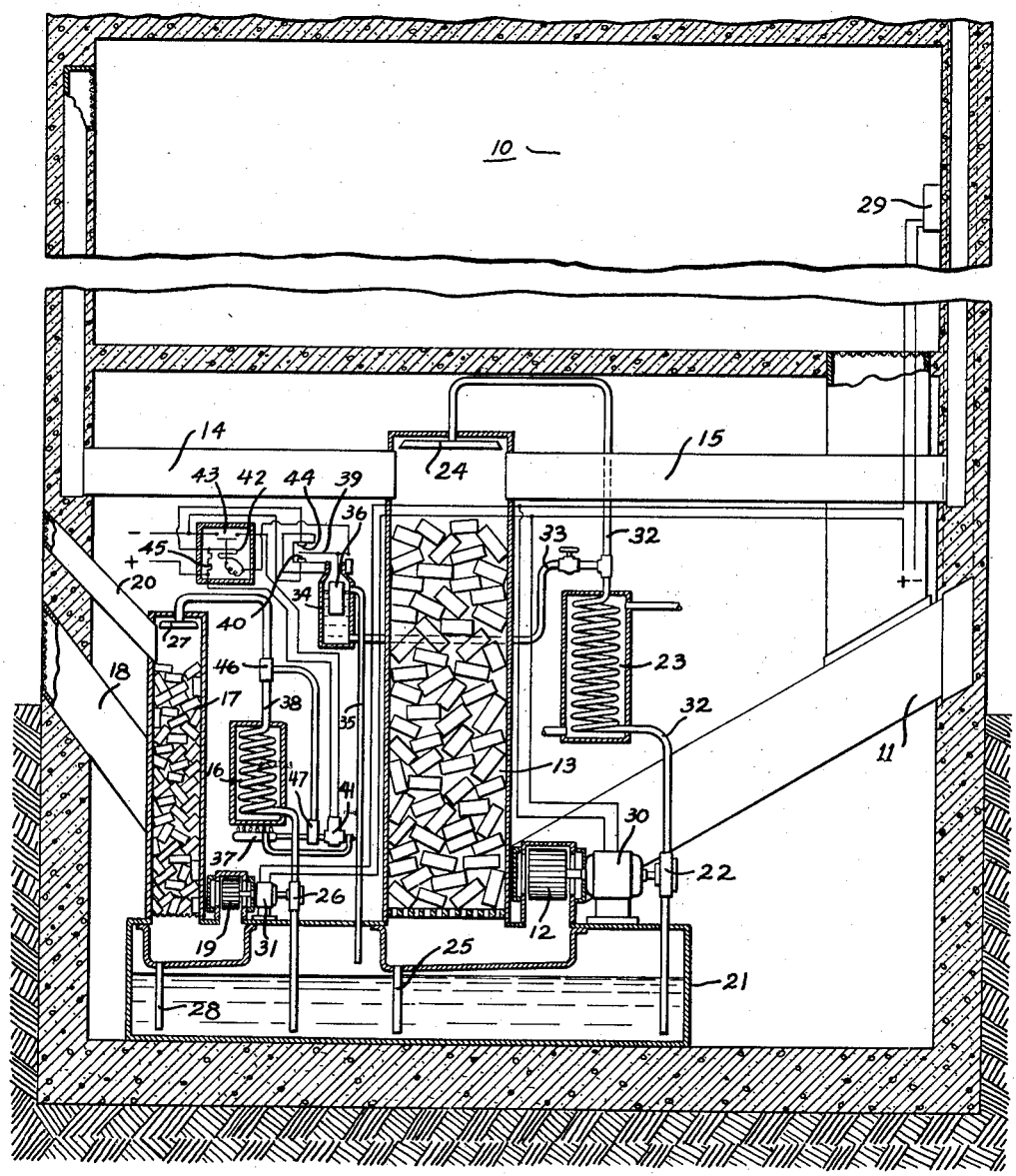

Patented Feb. 17, 1942

2,273,270

UNITED STATES PATENT OFFICE 2,273,270

CONCENTRATION APPARATUS

Gilbert A. Kelley, Toledo, Ohio, assignor to General Motors Corporation, Dayton, Ohio, a corporation of Delaware Original application July 20, 1932, Serial No. 623,531. Divided and this application April 2, 1937, Serial No. 134,564. Renewed December 6, 1939

3 Claims. (Cl. 159—44)

This invention relates to refrigeration, and more particularly to an apparatus for, and a method of, concentrating a liquid which may be used in conditioning air or selectively removing a constituent from a gas, or for other purposes.

This application is a division of Serial No. 623,531 filed July 20, 1932, and renewed September 30, 1936, now Patent No. 2,085,028, of June 29, 1939.

An object of this invention is to provide an apparatus for, and a method of, concentrating a liquid in an improved manner, and in which the solution or liquid may be concentrated practically to the crystallization point without danger of clogging up the apparatus, or in which the operation of the apparatus may be stopped without danger of clogging the apparatus due to crystallization during the cooling of the apparatus.

Further objects and advantages of the present invention will be apparent from the following description, reference being had to the accompanying drawing, wherein a preferred form of the present invention is clearly shown.

In the drawing:

The figure shows, partly in cross-section and partly in elevation, an apparatus for practicing this invention.

In the practice of this invention, the air to be conditioned, or the gas from which the constituent is to be removed, is contacted with a hygroscopic liquid, or a liquid having a selective affinity for the constituent to be removed, the contact being accomplished at a relatively low temperature, so that moisture is removed from the air or the constituent is removed from the gas. The liquid is regenerated by heating it to a relatively high temperature and contacting the heated liquid with a stream of air, or gas, to remove moisture, or the constituent, from the liquid. In the particular embodiment shown, the air or gas is circulated either from the room 10, or from a conduit 11 leading from the outside, or both, by means of a blower 12 and the stream of air or gas is forced through the contact tower or apparatus 13 where it comes in contact with a hygroscopic liquid, or with a liquid having an affinity for a constituent to be removed, and thereafter the air or gas is discharged through one or more conduits 14 or 15 which carry the air or gas to the desired place of use, in this particular embodiment being the room 10 and other similar enclosures.

The hygroscopic liquid is regenerated by heating the liquid in the heater 16, and while the liquid is in a heated condition, it is contacted with a stream of air or gas in the concentrating contact tower 17 where moisture, or the constituent, is removed by air or gas passing through the tower. In this particular embodiment in which air is being conditioned for use in a building, the air which removes the moisture from the liquid is taken from the outside of the building through the conduit 18, is forced by the fan 19 through the tower 17 and is discharged through the conduit 20 to the outside of the building.

In the preferred embodiment, the hygroscopic liquid is circulated in a closed cycle in a portion of which the liquid is cooled to a relatively cold temperature, and while in that relatively low temperature it is contacted with the air to be conditioned. Thus a sump 21 is provided for holding a main body of liquid, this liquid having such a water vapor pressure that when cooled to the desired temperature it imparts to the air the proper temperature and relative humidity. A portion of the liquid is circulated by means of the pump 22 from and to the main body of liquid in sump 21 through a cooler 23 where the liquid is cooled either by city water, air, or by mechanical refrigeration, and thereafter it is forced through the distributing head 24 and passes on to the contact tower 13 where it imparts the correct temperature and relative humidity to the air passing through the tower, the liquid returning through the pipe 25 to the sump 21.

The liquid is regenerated also in a closed circulating cycle, which in this particular embodiment is partly separate from the air conditioning liquid cycle. Thus a portion of the liquid is forced by the pump 26 from and to the main body of liquid in sump 21 through the heater 16 where it is heated to a relatively high temperature and passes on to the distributing head 27 for distribution and gravitational flow through the contact tower 17 where it comes in contact, in a heated condition, with a stream of air independent of the air being conditioned and returns in a concentrated condition through the pipe 28 to the sump 21. By this construction it is possible to concentrate the liquid to a much higher degree than the concentration of the main body of liquid in the sump 21. The rate of flow through the concentrating cycle is so controlled that it maintains the main body of liquid at the proper air conditioning concentration.

Automatic controls are provided for the apparatus. Thus a thermostat or hygrostat or a combination of the two is provided at 29 which controls the operation of the motors 30 and 31 which operate, respectively, blowers 12 and 19. The control 29 is of such a character that when the temperature and/or relative humidity in the room 10 rises above the desired limit then the motors 30 and 31 are caused to operate until such a time as the temperature and/or relative humidity are reduced to a lower desired limit. Controls of this type are well known and hence are not further described. An automatic control is also provided to maintain the liquid in the sump 21 at a predetermined degree of concentration or regeneration such that, when properly cooled, it imparts the desired temperature and relative humidity to the air passing tower 13. To this end means for controlling the removal of moisture or the constituent, from the liquid are provided, these being automatically responsive to the degree of concentration of the main body of liquid. Thus a portion of the liquid flowing through the pipe 32 is by-passed through the pipe 33 to a control chamber 34 provided with an overflow pipe 35 which returns the overflow to the sump 21. By a continuous flow through the pipes 33 and 35, the liquid in the chamber 34 is maintained at substantially the same concentration as the liquid in the sump 21 or at a concentration representative thereof. A hydrometer control 36 is placed in the chamber 34 which controls the action of the heating element or burner 37, so that the temperature of the liquid circulating in the pipe 38 is increased or decreased to govern the drying action taking place in the tower 17 in such a manner that the proper concentration of the liquid in the sump 21 is maintained. Thus if the liquid in the sump 21 tends to become too dilute, the contact arm 39 operated by the hydrometer float, contacts with the contact 40, and the gas control valve 41 is opened to intensify or light the burner 37. This may be accomplished in any suitable manner, and, in this particular embodiment, a current is caused to flow through the solenoid 42 which closes the relay 43 and creates a current flow through the solenoid of the valve 41. After the relay 43 has been closed, it remains closed, even after the arm 39 has disconnected from contact 40, because the relay 43 after it is closed maintains a current through solenoid 42 independently of the circuit through the arm 39 and contact 40 until such time as the contact arm 39 contacts with the contact 44. This latter contact shorts the solenoid 42 through the resistance 45 and permits the relay 43 to drop or open and thus close the valve 41, extinguish or turn down the burner 37 and stop or reduce the concentrating action in the tower 17. A thermostat 46 is provided to be responsive to the temperature of the liquid leaving the heater 16, and this thermostat operates a valve 47 which controls the burner 37 to maintain the liquid passing from the heater 16 at a predetermined temperature. The liquid, because of this predetermined temperature, is concentrated by contact with air in 17 substantially to the crystallization point when it enters the sump 21.

By the construction shown, the concentration in the contact tower 17 may be carried substantially to the crystallization point of the solution without danger of clogging; and thus the size of the concentrating portion of the apparatus can be materially reduced. When the apparatus is shut down, the slight amount of liquid remaining in the contact tower, after its automatic gravitational drainage into the sump 21, may be allowed to cool and crystallize without danger of entirely closing the concentrating circuit. The crystals thus formed throughout the contact mass are not sufficient in size to clog all of the air or liquid passages and thus when the apparatus is restarted a partial flow is permitted which quickly dissolves and removes the crystals from the tower. Thus all portions of the apparatus which contain liquid which is likely to crystallize at normal atmospheric temperatures are automatically drained when the apparatus stops. If, on the other hand, the usual evaporator should be substituted for the tower 17, then if the liquid should be concentrated substantially to the crystallization point in the evaporator, it would be necessary to drain the evaporator before shutting down the plant or the liquid in the evaporator would quickly crystallize when it cooled during the shut-down period and create a difficult and dangerous restarting condition.

By this construction also it is not necessary to have a heat interchanger in the concentrating cycle between the liquids flowing to and from the evaporator. The necessity for such an interchanger is removed in my apparatus because the liquid flowing through the tower 17 is cooled substantially to atmospheric temperature by the air at the bottom of the tower before the liquid returns into the sump 21.

This method may be practiced for conditioning air or for removing a constituent from a gas. When it is used for conditioning air, the hygroscopic solution or liquid may be of any of the liquids used for this purpose, such as solutions of $CaCl_2$, $NaCl$, $LiNO_2$, $Na_2SO_4$, $H_2SO_4$, and of the water soluble lithium halides, lithium chloride, lithium bromide and lithium iodide and other lithium salts which are halogen in their vapor pressure characteristics. Molten salts, such as $LiNO_5$ $H_2O$, water soluble organic liquids, such as glycerine ethylene glycol, or solutions of organic substances, such as sugar, glucose may be used.

While the form of embodiment of the invention as herein disclosed, constitutes a preferred form, it is to be understood that other forms might be adopted, all coming within the scope of the claims which follow.

What is claimed is as follows:

1. Liquid concentrating apparatus comprising a sump containing a main body of liquid to be concentrated, a closed heater, a gas and liquid contact tower, a liquid pump, and connections for circulating liquid from said main body through said pump, heater and contact tower and back to said main body, a control cup, cooling means, means for circulating a quantity of liquid from said main body through said cooling means, control cup and back to said main body, and means for controlling the concentrating operation in accordance with conditions of liquid in said control cup.

2. Liquid concentrating apparatus comprising a sump containing a main body of liquid to be concentrated, a closed heater, a gas and liquid contact tower, a liquid pump, and connections for circulating liquid from said main body through said pump, heater and contact tower and back to said main body, means responsive to the temperature of liquid in said heater controlling the addition of heat by said heater, a control cup, cooling means, means for circulating a quantity of liquid from said main body through said cooling means, control cup and back to said main body, and means for controlling the concentrating operation in accordance with conditions of liquid in said control cup.

3. Liquid concentrating apparatus comprising a sump containing a main body of liquid to be concentrated, a closed heater, a gas and liquid contact tower, a liquid pump, and connections for circulating liquid from said main body through said pump, heater and contact tower and back to said main body, means responsive to the temperature of liquid in said heater controlling the addition of heat by said heater, a control cup, means for circulating a quantity of liquid from said main body through said control cup and back to said main body, and means for controlling the concentrating operation in accordance with conditions of liquid in said control cup.

GILBERT A. KELLEY.